United States Patent
Kotani (10) Patent No.: US 7,072,878 B2
(45) Date of Patent: Jul. 4, 2006

(54) DATA SEARCH APPARATUS AND METHOD

(75) Inventor: Takuya Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 10/002,224

(22) Filed: Dec. 5, 2001

(65) Prior Publication Data

US 2002/0078038 A1 Jun. 20, 2002

(30) Foreign Application Priority Data

Dec. 20, 2000 (JP) .............................. 2000-387703

(51) Int. Cl.
G06F 17/30 (2006.01)
(52) U.S. Cl. .......................... 707/1; 707/100; 707/201; 707/203; 345/536; 715/513
(58) Field of Classification Search ................ 707/2, 707/3, 4, 5, 6, 103 R, 104.1, 205, 10, 200, 707/1, 8, 100, 101, 102, 104, 201, 203; 709/202, 709/201, 218, 223; 717/114; 345/536, 694; 358/1.9; 705/1; 715/501.1, 513
See application file for complete search history.

(56) References Cited

U.S. PATENT DOCUMENTS

| 5,175,850 A | * | 12/1992 | Hirata et al. ................. 707/200 |
| 5,870,741 A | * | 2/1999 | Kawabe et al. ................. 707/5 |
| 6,209,124 B1 | * | 3/2001 | Vermeire et al. ............ 717/114 |
| 6,366,909 B1 | * | 4/2002 | Yuasa et al. .................... 707/4 |
| 6,748,383 B1 | * | 6/2004 | Wada et al. .................. 707/10 |

* cited by examiner

*Primary Examiner*—Shahid Alam
*Assistant Examiner*—Fred I. Ehichioya
(74) *Attorney, Agent, or Firm*—Fitzpatrick, Cella, Harper & Scinto (57) ABSTRACT

A data search apparatus searches a database in which data consisting of still image data and meta-data is registered. The data is searched based on a set search condition and the meta-data contained in each item of the data registered in the database. While conducting a search, if there is data which does not actually exist in a thumbnail list, that data is deleted from the database. If there is any data which is stored in a predetermined logical area and which is not registered in the database, that data is added to the data in the database.

19 Claims, 9 Drawing Sheets

| ATTRIBUTES | DATA VALUES |
|---|---|
| PhotoGrapher | Ichiro Suzuki |
| Date | 1999-11-4 |
| Location | Yebisu Garden Place |
| Event | Party |
| Keyword | Jiro Satoh |
| Keyword | Saburo Tanaka |

```
<?xml version = "1.0" encoding = "Shift_JIS"?>
<Photo>
    <ITEM ATTR = "PhotoGrapher">Ichiro Suzuki</ITEM>
    <ITEM ATTR = "Date">1999-11-4</ITEM>
    <ITEM ATTR = "Location">Yebisu Garden Place</ITEM>
    <ITEM ATTR = "Event">Party</ITEM>
    <ITEM ATTR = "Keyword">Jiro Satoh</ITEM>
    <ITEM ATTR = "Keyword">Saburo Tanaka</ITEM>
</Photo>
```

FIG. 9

DATA SEARCH APPARATUS AND METHOD

BACKGROUND OF THE INVENTION

1. Field of the Invention

The present invention relates to a method and apparatus for searching data consisting of binary data and meta-data. The invention also relates to a storage medium in which a control program implementing the above-described method is stored.

2. Description of the Related Art

Meta-data is "data concerning data", and is also used for describing binary data, such as image data or audio data. By adding meta-data to binary data, image data and audio data is searchable by using keywords. The utility of meta-data has become popular due to the search feature. Accordingly, attempts have been made to use binary meta-data in various formats for conducting the search.

In a known database, however, if registered binary data to be searched is moved or deleted, such movement or deletion of data is not reflected in the database, thereby failing to obtain a correct search result.

SUMMARY OF THE INVENTION

Accordingly, in view of the above-described problem, it is an object of the present invention to improve ease of operation when conducting a data search by automatically reflecting the addition or deletion of binary data to be searched in the registration status of a database.

It is another object of the present invention to flexibly respond to internal data by using meta-data described in a data description language, for example, to make it possible to set desired attributes and corresponding values to meta-data by using a data description language even if binary data and meta-data are recorded in the same file, which would otherwise enable the setting of only predetermined attributes and corresponding values to meta-data if the meta-data is described in a binary format.

In order to achieve the above-described objects, according to one aspect of the present invention, there is provided a data search apparatus for conducting a search of data which includes binary data and meta-data. The data search apparatus includes a database in which the data to be searched is registered. A search unit conducts a search of the data based on a set search condition and the meta-data contained in each item of the data registered in the database. A matching unit matches actually existing data in the database to the data registered in the database while the search unit is conducting a search.

According to another aspect of the present invention, there is provided a data search method for conducting a search of data which includes binary data and meta-data. The data search method includes: a searching step of conducting a search of the data based on a set search condition and the meta-data contained in each item of the data registered in a database; and a matching step of matching actually existing data in the database to the data registered in the database during the execution of the searching step.

According to still another aspect of the present invention, there is provided a storage medium for storing a control program to be executed by a computer. The control program includes: a searching step of conducting a search of the data based on a set search condition and the meta-data contained in each item of the data registered in a database; and a matching step of matching actually existing data in the database to the data registered in the database during the execution of the searching step.

Further objects, features and advantages of the present invention will become apparent from the following description of the preferred embodiments with reference to the attached drawings.

DESCRIPTION OF THE PREFERRED EMBODIMENTS

The present invention is described in detail below with reference to the accompanying drawings through illustration of preferred embodiments.

FIRST EMBODIMENT

In the following embodiment, meta-data described in a data description language is attached to binary data, and by using such meta-data, the binary data is searched. If there is any binary data which is not registered in a database, such binary data is automatically registered in the database by using the meta-data attached to such binary data. While the search is being conducted, if it is found that binary data registered in the database does not exist in the database, the registration of such binary data is deleted from the directory or the list display portion. With this arrangement, even if the binary data to be searched is moved or deleted, such movement or deletion of data is automatically reflected in the database.

Figure 1:
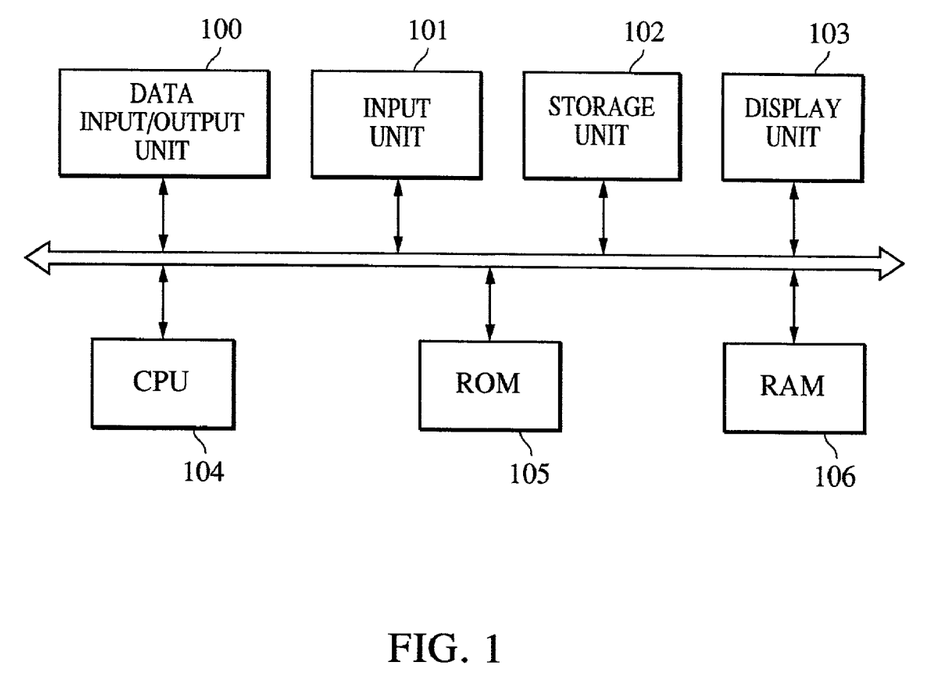
FIG. 1 is a block diagram illustrating the configuration of an image search apparatus according to a first embodiment of the present invention.

FIG. 1 is a block diagram illustrating the configuration of an image search apparatus according to a first embodiment of the present invention. Referring to FIG. 1, a data input/output unit 100 reads data, such as images, picked up by, for example, a digital camera, from a memory card via a personal computer (PC) card or a universal digital bus (USB). The data input/output unit 100 also writes data, such as images, into a memory card. An input unit 101, which includes a keyboard or a pointing device, inputs data in response to an instruction from a user. The pointing device includes a mouse, a trackball, a tablet, and so on. A storage unit 102 stores binary data, meta-data, etc., and generally, a hard disk is used as the storage unit 102. A display unit 103 displays images, such as a graphical user interface (GUI), and generally, a cathode ray tube (CRT) or a liquid crystal display device is used.

Figure 6:
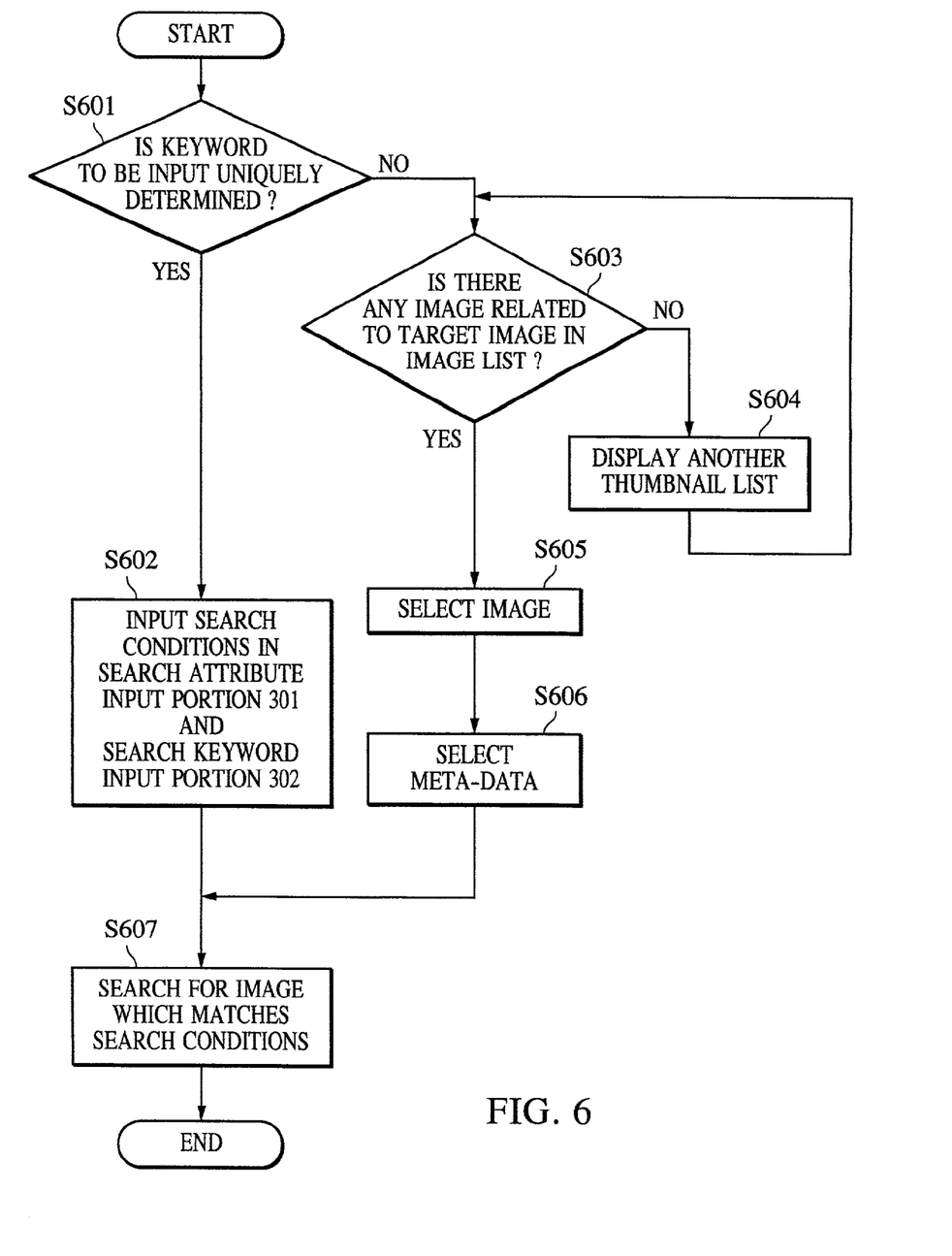
FIG. 6 is a flow chart illustrating a process for searching the still image data by using the GUI screen shown in FIG. 3.
Figure 7:
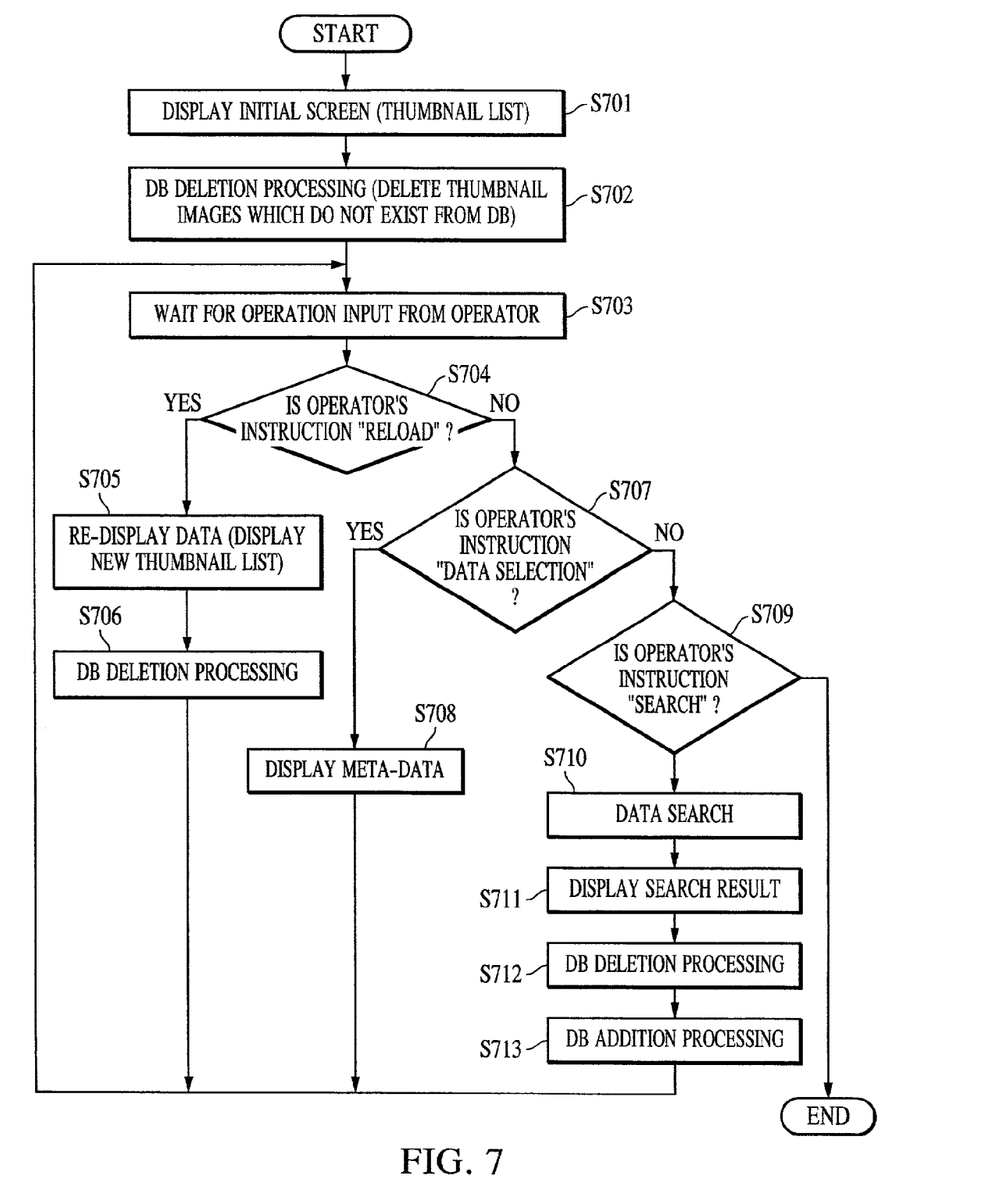
FIG. 7 is a flow chart illustrating a control process performed by the image search apparatus according to the first embodiment of the present invention.
Figure 8:
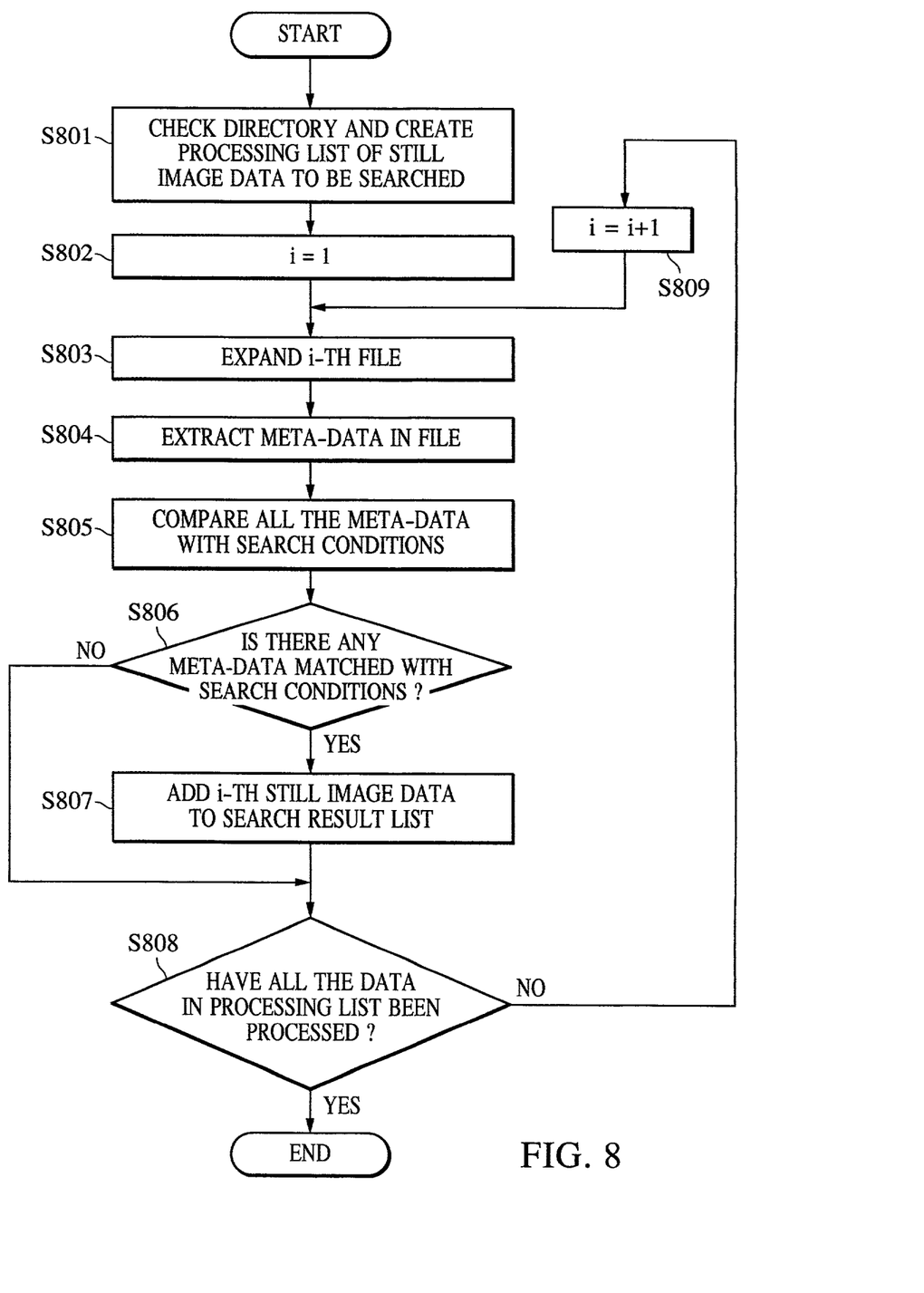
FIG. 8 is a flow chart illustrating a process for searching the data which is not registered in a database.

A central processing unit (CPU) 104 controls the entire processing performed by the above-described elements. A read only memory (ROM) 105 and a random access memory (RAM) 106 provide programs, data, and work areas to the CPU 104 for performing the above-described processing. Control programs used for the processing indicated by the flow charts of FIGS. 6 through 8 are stored in the storage unit 102 or the ROM 105. If the control programs are stored in the storage unit 102, they are first read into the RAM 106 and then are executed.

As for the system configuration, various elements other than the above-described elements are usable. However, since they are not the essential features of the present invention, an explanation thereof is omitted.

Figure 2A:
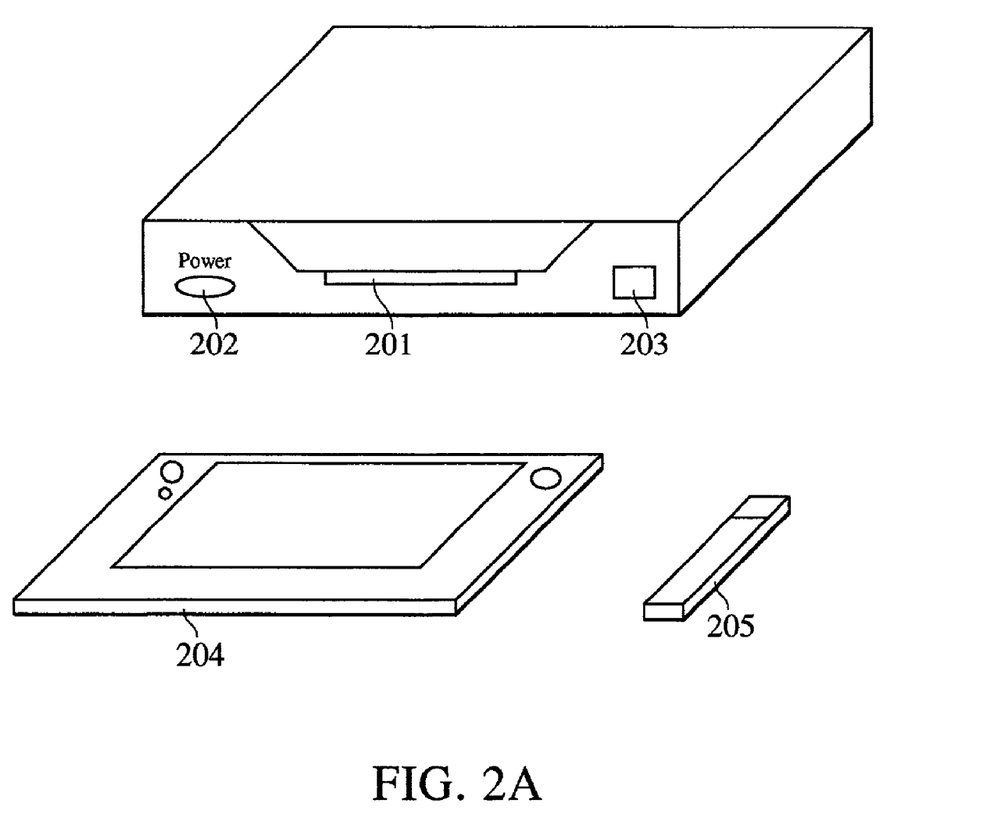
FIGS. 2A and 2B are external views illustrating the image search apparatus shown in FIG. 1.
Figure 2B:
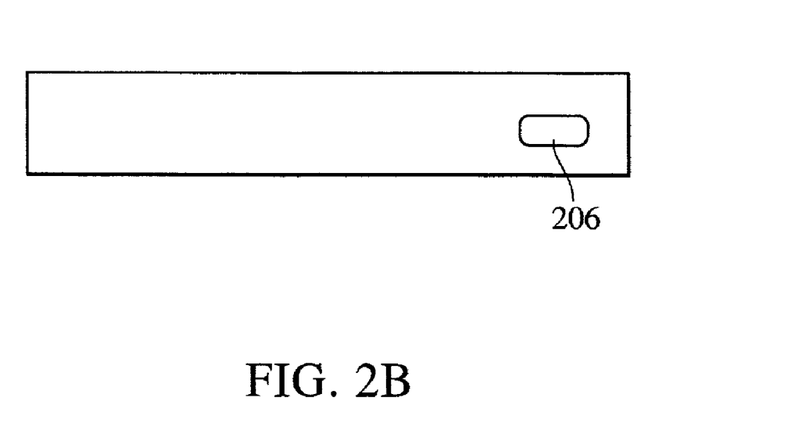

FIGS. 2A and 2B are external views illustrating the image search apparatus constructed in accordance with the first embodiment of the present invention, and more specifically, FIGS. 2A and 2B are a perspective view and a rear view, respectively, of the image search apparatus. A PC card slot 201 is integrated into the front surface of the image search apparatus, and images are read into the apparatus via a PC card. A power switch 202 is used for turning the image search apparatus on or off. An infrared detector 203 receives a signal from a wireless keyboard 204 or a remote controller 205. The wireless keyboard 204 or the remote controller 205 forms the input unit 101. On the rear surface of the image search apparatus, a display output terminal 206 is provided, and a display device, such as a CRT or a liquid crystal display device, which forms the display unit 103, is connected to the display output terminal 206. In addition to the display output terminal 206, a USB terminal for connecting a digital camera to the image search apparatus, or a network connecting terminal for connecting the apparatus to a network may be provided.

Figure 5:
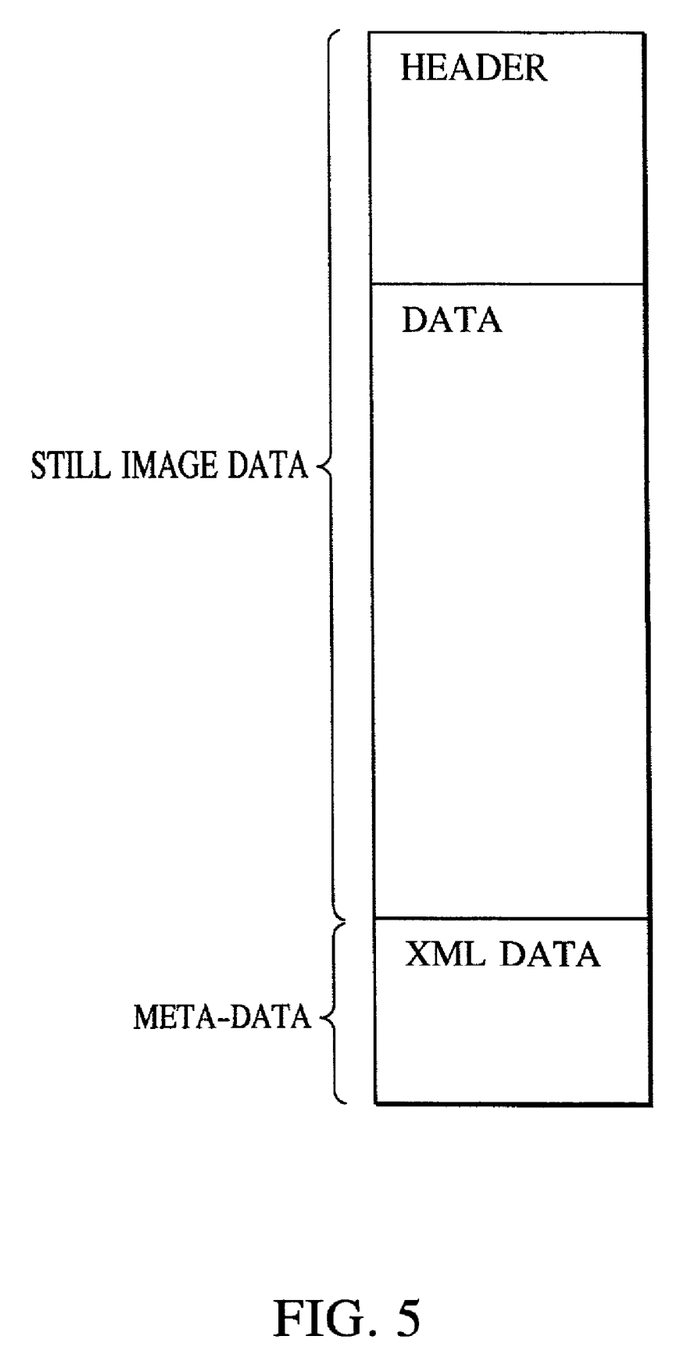
FIG. 5 illustrates meta-data attached to the still image data used in the first embodiment of the present invention.

In the first embodiment, it is assumed that binary data to be searched is still image data. Meta-data described in a data description language is attached, as shown in FIG. 5, to all the still image data. In the first embodiment, it is also assumed that the meta-data is described in the extensible Markup Language (XML). However, any type of data description language, for example, the HyperText Markup Language (HTML) or the Standard Generalized Markup Language (SGML), is usable.

In this embodiment, since meta-data is added after the still image data, as shown in FIG. 5, it does not interfere with the processing performed on the still image data (binary data) by a known application. That is, by adding the meta-data after the still image data, the still image data is viewable by using a known application.

Figure 4:
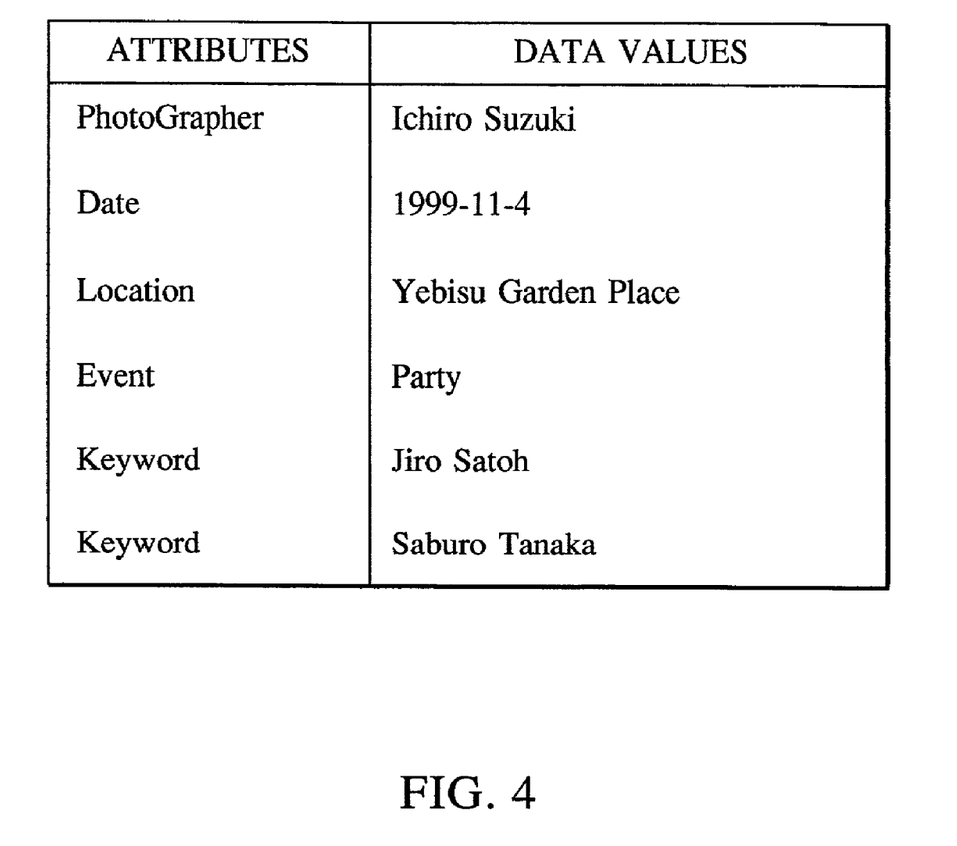
FIG. 4 illustrates an example of meta-data to be attached to the still-image data used in the first embodiment of the present invention.

In the first embodiment, the meta-data attached to the still image data is indicated, as shown in FIG. 4, by a pair of data attributes and data values. In the example shown in FIG. 4, as the attributes of the meta-data, five attributes, such as "PhotoGrapher", "Date", "Location", "Event", and "Keyword", are used. As the corresponding data values, the photographer, the time and the date at which the photograph was taken, the place at which the photograph was taken, the name of the event, and the name of the subject, respectively, are indicated.

Figure 3:
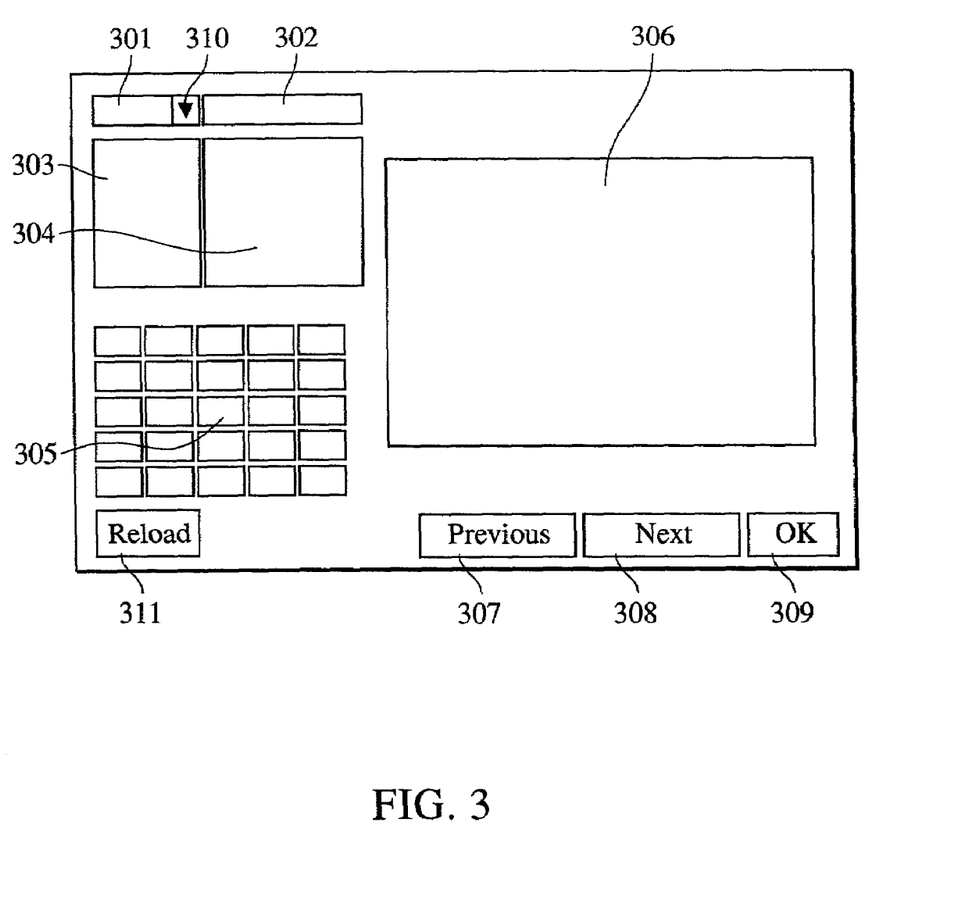
FIG. 3 illustrates an example of a graphical user interface (GUI) screen while still image data is being searched.

FIG. 3 illustrates an example of the GUI screen while the still image data is being searched. A search condition input unit includes a search attribute input portion 301 and a search keyword input portion 302, and is used for inputting search conditions concerning the meta-data while conducting the search of the still image data. The search attribute input portion 301 is used for specifying the above-described attribute of the meta-data as the search condition, while the search keyword input portion 302 is used for specifying the above-described data value of the meta-data as the search condition. By pressing an inverted delta symbol button 310 located at the right side of the search attribute input portion 301, a list of known attributes is displayable in real time.

A meta-data display unit includes an attribute display portion 303 and a data value display portion 304. In the attribute display portion 303 and the data value display portion 304, the attribute and the data value, respectively, of a thumbnail image selected from the thumbnails of a list display portion 305 are displayed. By clicking the data value indicated in the data value display portion 304, the corresponding attribute and the data value are designated as the search conditions.

The list display portion 305 randomly selects n images from the images matching the search conditions, and displays a thumbnail list containing the selected n images. By clicking a desired thumbnail from the thumbnail list, the corresponding image is selected. In the initial state, since the search conditions are not yet designated, the thumbnails corresponding to the n images selected from all the still image data to be searched are displayed. When the search conditions are specified, the thumbnails corresponding to the n images selected from the still image data matching the search conditions are displayed. In the first embodiment, the maximum number of thumbnails to be displayed in the list display portion 305 at one time is 25. By pressing a reload button 311, subsequent n thumbnails are displayed in the list display portion 305.

A selected image display portion 306 displays the image selected from the thumbnail images displayed in the list display portion 305. By using a previous button 307 and a next button 308, the thumbnail images disposed before and after the currently selected thumbnail image are selected and viewed. By pressing an OK button 309, the GUI is closed.

FIG. 6 is a flow chart illustrating a process for searching the still image data by using the GUI shown in FIG. 3. As discussed above, in the initial state, 25 thumbnail images randomly selected from all the still image data to be searched are displayed in the list display portion 305.

In step S601, a determination is first made as to whether the user already knows a keyword contained in the meta-data of the target still image data, i.e., whether a keyword to be input is uniquely determined. If the outcome of step S601 is yes, the process proceeds to step S602. In step S602, the attribute is specified by using the search attribute input portion 301, and the search keyword is designated by using the search keyword input portion 302. Accordingly, the specified keyword and the corresponding attribute are set as the search conditions. Then, the process proceeds to step S607 in which the image matching the search conditions is searched.

If it is found in step S601 that the search keyword is not uniquely determined, the process proceeds to step S603. In step S603, by viewing the thumbnails displayed in the list display portion 305, the user checks for still image data which has been photographed in the same situation as the target still image data. If the result of step S603 is no, the process proceeds to step S604 in which another thumbnail list containing different 25 images is displayed by pressing the reload button 311.

As described above, after switching the images in the list display portion 305 in step S604, if it is found in step S603 that there is still image data related to the target image data, the process proceeds to step S605. In step S605, by clicking the corresponding thumbnail, the still image data is selected. Then, the selected still image data is displayed in the selected image display portion 306, and the attributes and the data values of the meta-data of the selected image data are respectively displayed in the attribute display portion 303 and the data value display portion 304. Then, in step S606, by selecting a suitable keyword from the data values displayed in the data value display portion 304, the selected keyword and the corresponding attribute are set as the search conditions. Accordingly, as described above, the search conditions are set without the need to directly input the search keyword. Thereafter, the process proceeds to step S607 in which the image matching the search conditions is searched.

In step S606, the keyword in the data value display portion 304 is selected by using a pointing device. However, by referring to the keywords displayed in the data value display portion 304, a suitable keyword is directly input into the search keyword input portion 302.

As discussed above, in step S607, the search is conducted according to the search conditions set in step S602 or S606. Details of the search operation are described below. The 25 thumbnail images randomly selected from the still image data obtained as a search result (matching the search conditions) are displayed in the list display portion 305 as the search result.

The system process for implementing the above-described processing and operation is shown in, for example, FIG. 7. More specifically, FIG. 7 is a flow chart illustrating the control processing performed by the image search apparatus according to the first embodiment of the present invention. In the following description, data to be searched in the following processing is data consisting of still image data and meta-data, such as that shown in FIG. 5.

In step S701, the thumbnail images to be searched are displayed in the list display portion 305. As discussed above, 25 still images randomly selected from all the still image data to be searched which are registered in the database are displayed in the list display portion 305. In step S702, it is determined whether the image data to be searched actually exists in the database. If it is found that there is image data which does not actually exist in the database, such data is deleted from the database. Steps S701 and S702 may be executed concurrently, or step S702 may be executed first, and after checking the existence of the thumbnails, the thumbnail images may be displayed. In this case, thumbnail images which do not exist in the database are not displayed. The same applies to steps S705 and S706, and steps S711 and S712.

In step S703, the process waits for the input of an operation from the operator by using the GUI. If any operation is performed, the process proceeds to step S704.

It is determined in step S704 whether the operator has pressed the reload button 311. If the outcome of step S704 is yes, the process proceeds to step S705. In step S705, the data to be searched is selected in a manner similar to step S701, and the corresponding thumbnail images are displayed in the list display portion 305. Then, in step S706, data deletion processing similar to that in step S702 is performed. Then, the process proceeds to step S703 in which the process waits for a new operation from the operator.

If it is found in step S704 that the operator has not pressed the reload button 311, the process proceeds to step S707. In step S707, it is determined whether the operator has selected a thumbnail image displayed in the list display portion 305, or changed the thumbnail to be displayed in the selected image display portion 306 by pressing the previous button 307 or the next button 308. If the result of step S707 is yes, the process proceeds to step S708. In step S708, the meta-data is extracted from the image data corresponding to the selected thumbnail, and the attributes and the data values of the meta-data are respectively displayed in the attribute display portion 303 and the data value display portion 304. Upon completion of the processing of step S708, the process returns to step S703, and the process waits for a new operation input from the operator.

Figure 9:
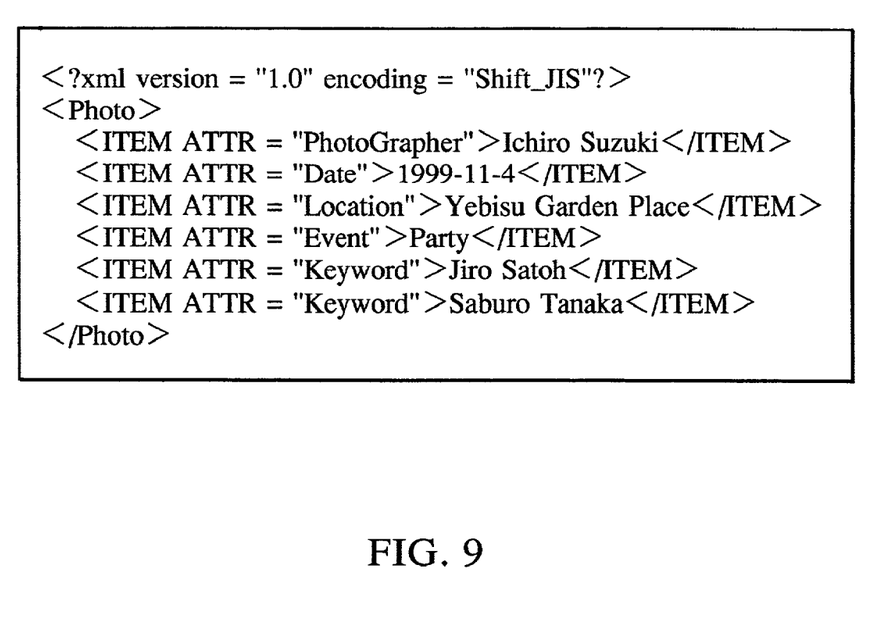
FIG. 9 illustrates an example of the meta-data shown in FIG. 4 described in the extensible Markup Language (XML).

The extraction of the meta-data from the image data in step S708 is performed as follows. In the first embodiment, as shown in FIG. 5, the meta-data described in the XML is attached after the still image data. In this case, the meta-data is described, as shown in FIG. 9. Accordingly, the portion sandwiched between <Phot> and </Phot> is searched from the back portion of the data file, thereby extracting the meta-data.

If it is found in step S707 that the thumbnail has not been selected, the process proceeds to step S708 in which it is determined whether the operator has given an instruction to conduct the search by selecting the data in the data value display portion 304 or by inputting the keyword into the search keyword input portion 302. If the outcome of step S709 is yes, the process proceeds to step S710. Although the search attribute input portion 301 and the button 310 are provided for specifying the attribute as the search condition, the attributes of the meta-data are not used for conducting the search in this embodiment. Accordingly, if it is found in step S709 that the operator has performed any operation on the search attribute input portion 301 or the attribute display portion 303, the process returns to step S703. If the operator has performed an operation other than those determined in steps S704, S707, and S709, it means that the operator has pressed the OK button 309. Accordingly, the GUI screen is closed. As discussed above, the attributes of the meta-data are not used for conducting the search in this embodiment. This means that the attributes may be safely ignored when conducting the search, though the attribute and the corresponding data value must be input as the search conditions in step S602 for the subsequent steps. Alternatively, both the attribute and the data value may be used for conducting the search.

In step S710, the database is searched by using the data value of the meta-data specified in step S709 as the search keyword. If there is any data in the files under a predetermined directory which is not registered in the database, a search is also conducted for such data. More specifically, the meta-data contained in the unregistered data under the predetermined directory is checked and compared with the search keyword. Then, if the meta-data matching the search keyword is found, the corresponding image data is also output together with the search result obtained by searching the database. Details of the search operation for unregistered data are described below.

In step S711, according to the search result obtained in step S710, n thumbnail images corresponding to the found image data are displayed in the list display portion 305. In this case, if there is any thumbnail which does not actually exist, such thumbnail images are deleted from the database in step S712, as in the case of steps S702 and S706.

If there is any data to be searched which is not registered in the database, such data is registered in step S713. The registration of such data in the database is performed by using the meta-data attached to the still image data. When registering binary data in the database, the file name (path name) of the binary data is registered. As the attribute and the attribute value of the binary data to be registered, the attribute of the corresponding meta-data and the value of the corresponding meta-data (attribute value) are respectively assigned. Upon completion of the processing in step S713, the process returns to step S703 in which the process waits for a new operation input from the operator. Concerning the thumbnails, they are registerable when the corresponding still image data is registered in the database, in which case, the registered thumbnails are displayed in the list display portion 305. If thumbnail images are not registered in the database, they are extracted or generated from the corresponding image data to be displayed.

FIG. 8 is a flow chart illustrating a process for the search operation for the data which is not registered in the database. In step S801, the directory in which the data to be searched is stored is checked, and a processing list of the data to be searched is created. Then, in step S802, the counter i of the processing list is set to 1. In step S803, the still image data contained in the i-th data file of the processing list is expanded. Then, in step S804, the meta-data contained in the expanded data file is extracted. As the XML tags for defining the meta-data, any type of tags may be used, and in this embodiment, the meta-data is partitioned by <Photo> and </Photo>.

An example of the meta data shown in FIG. 4 described in the XML format is shown in FIG. 9. After extracting the meta-data partitioned between <Photo> and </Photo> in step S804, the process proceeds to step S805. In step S805, the attributes and the data values of the meta-data are extracted and compared with the search conditions. The meta-data may be defined in any format, and in this embodiment, the attribute "str1" and the data value "str2" of the meta-data are described as <ITEM ATTR="str1">str2</ITEM>.

In step S805, the extracted meta-data is compared with the search condition (search keyword). More specifically, in this embodiment, it is determined whether str2 coincides with the data value of the search keyword. As discussed above, since only the data value (str2) is compared with the search condition without using the attribute (str1), a more flexible search is conducted. For conducting a more precise search, both the data value (str2) and the attribute (str1) are used and compared with the attribute and the data value of the search keyword, respectively.

It is then determined in step S806 whether there is any meta-data matched with the search condition. If the outcome of step S806 is yes, the process proceeds to step S807 in which the i-th data is registered in the search result list. Then, it is determined in step S808 whether all the still image data registered in the processing list have been processed. If the result of step S808 is yes, the search processing is completed. If not, the process proceeds to step S809 in which i is incremented by 1, and the process returns to step S803.

If meta-data is not detected in step S804, it means that meta-data is not attached to the still image data. Accordingly, steps S805 through S807 are omitted, and the process proceeds to step S808. If meta-data is not attached, it is meaningless to register the corresponding still image data in the database. Accordingly, it is preferable that such data (without meta-data) is not registered in step S713.

According to the above-described processes, the still image data with the meta-data described in a data description language is searched. If there is any binary data to be searched which is not registered in the database, it is automatically registered by using the corresponding meta-data. While the search is being conducted, if it is found that binary data registered in the database does not actually exist in the database, the registration of such binary data is automatically deleted from the directory or the list display portion. According to this search method, the data registered in the database is moved or deleted while being transparent to the user. This also eliminates the need for the database administrator to register the binary data to be added in the database.

SECOND EMBODIMENT

In the first embodiment, the above-described search method is used for searching the still image data. The present invention is also applicable to moving picture data.

In the case of moving picture data, the first scene is extracted from the moving picture data, and frames are randomly selected from the first scene. Then, the corresponding thumbnail images are displayed in the list display portion 305. As in the case of the still images, if a moving picture is selected in the list display portion 305, it is accordingly displayed in the selected image display portion 306. With this arrangement, even if both moving pictures and still images are to be searched, they are handled in a manner similar to the first embodiment. Accordingly, both the still images and the moving pictures are searched without presenting any unnatural feeling to the user.

As the binary data to be searched, instead of the still image data or the moving picture data, audio data may be used. In this case, the selected audio data is played back rather than being displayed in the selected image display portion 306.

In the first and second embodiments, the thumbnails are displayed in the list display portion 305. Alternatively, a file name list is displayed. In particular, if the binary data to be searched is audio data, the corresponding file name list is displayed.

In the foregoing embodiments, a pointing device, such as a mouse, a trackball, or a tablet, is used for specifying the thumbnail in the list display portion 305 or designating the keyword in the data value display portion 304, or for operating the various buttons. Alternatively, a touch panel, which is formed on the display surface of the data search apparatus, or a software keyboard is used.

Instead of using a keyboard, the conditions (keywords) are directly input into the search attribute input portion 301 or the search keyword input portion 302 by using audio means (which requires speech recognition processing) or barcode means. Alternatively, a software keyboard is used. Alternatively, the keyword is specified with a number assigned to the keyword. In this case, by assigning serial numbers to the individual meta-data when displaying the data values in the data value display portion 304, the keyword is designated with the assigned number.

The present invention is applicable to a single device (for example, a copying machine or a facsimile) or a system consisting of a plurality of devices (for example, a host computer, an interface, a reader, and a printer).

The objects of the present invention are also achievable by the following modification. A storage medium for storing a software program code implementing the functions of the first or second embodiment is supplied to a system or an apparatus. Then, a computer (or a CPU or an MPU) of the system or the apparatus reads and executes the program code from the storage medium.

In this case, the program code itself read from the storage medium implements the functions of the present invention.

Accordingly, a storage medium storing such program code constitutes the present invention.

Examples of the storage medium for storing and supplying the program code include a floppy disk, a hard disk, an optical disc, a magneto-optical disk, a compact disc read only memory (CD-ROM), a CD-recordable (CD-R), a magnetic tape, a non-volatile memory card, and a ROM.

The functions of the foregoing embodiments are implementable not only by running the read program code on the computer, but also by wholly or partially executing the processing by an operating system (OS) running on the computer or in cooperation with other application software based on the instructions of the program code. The present invention also encompasses such a modification.

The functions of the above-described embodiments are also implementable by the following modification. The program code read from the storage medium is written into a memory provided on a feature expansion board inserted into the computer or a feature expansion unit connected to the computer. Then, a CPU provided for the feature expansion board or the feature expansion unit partially or wholly executes processing based on the instructions of the program code.

As described above, according to the present invention, even if binary data to be searched is added or deleted to or from a database, such addition or deletion is automatically reflected in the database, thereby improving the ease of operation for searching the binary data.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data search apparatus for conducting a search of data which includes binary data and meta-data from a database in which the data to be searched is registered, comprising:
    list display means for selecting a predetermined number of data from the data registered in the database, and for displaying a list of information corresponding to the selected data;
    meta-data display means for displaying the meta-data contained in the data selected from the list;
    setting means for setting the search condition from the meta-data displayed by said meta-data display means;
    execution means for conducting a search of the data registered in the database based on the search condition set by said setting means; and
    matching means for prohibiting said list display means from displaying information corresponding to data which does not actually exist in the database, and deletes the registration of said data from the database,
    wherein said execution means also conducts a search of data which is stored in a predetermined logical area and which is not registered in the database, and said matching means additionally registers the data in the database,
    and wherein said list display means displays a list of a search result obtained by the search by said execution means.

2. A data search apparatus according to claim 1, wherein the meta-data is described in a data description language.

3. A data search apparatus according to claim 2, wherein the data description language is one of XML, SGML, and HTML.

4. A data search apparatus according to any one of claims 1 to 3, wherein the meta-data is attached after the binary data.

5. A data search apparatus according to claim 1, wherein the binary data is one of still image data, moving picture data, and audio data.

6. A data search apparatus according to claim 1, wherein said list display means displays a list of thumbnails corresponding to the data to be searched.

7. A data search apparatus according to claim 1, wherein said list display means displays a list of file names corresponding to the data to be searched.

8. A data search apparatus according to claim 1, wherein said setting means sets the search condition by directly inputting a keyword.

9. A data search apparatus according to claim 1, wherein said matching means additionally registers the data in the database based on the meta-data attached to the data.

10. A data search method for conducting a search of data which includes binary data and meta-data, comprising:
    a list display step of selecting a predetermined number of data from the data registered in the database, and of displaying a list of information corresponding to the selected data;
    a meta-data display step of displaying the meta-data contained in the data selected from the list;
    a setting step of setting the search condition from the meta-data displayed in said meta-data display step;
    an execution step of conducting a search of the data registered in the database based on the search condition set in said setting step; and
    a matching step of prohibiting execution of said list display step from displaying information corresponding to data which does not actually exist in the database, and deletes the registration of the data,
    wherein said search step also includes conducting a search of data which is stored in a predetermined logical area and which is not registered in the database, and said matching step additionally registers the data in the database,
    and wherein said list display step includes displaying a list of a search result obtained by the search made in said execution step.

11. A data search method according to claim 10, wherein the meta-data is described in a data description language.

12. A data search method according to claim 11, wherein the data description language is one of XML, SGML, and HTML.

13. A data search method according to any one of claims 10 to 12, wherein the meta-data is attached after the binary data.

14. A data search method according to claim 10, wherein the binary data is one of still image data, moving picture data, and audio data.

15. A data search method according to claim 10, wherein said list display step includes displaying a list of thumbnails corresponding to the data to be searched.

16. A data search method according to claim 10, wherein said list display step includes displaying a list of file names corresponding to the data to be searched.

17. A data search method according to claim 10, wherein said setting step includes setting the search condition by directly inputting a keyword.

18. A data search method according to claim 10, wherein said matching step additionally registers the data in the database based on the meta-data attached to the data.

19. A storage medium for storing a control program to be executed by a computer, said control program comprising:
- a list display step of selecting a predetermined number of data from the data registered in the database, and of displaying a list of information corresponding to the selected data;
- a meta-data display step of displaying the meta-data contained in the data selected from the list;
- a setting step of setting the search condition from the meta-data displayed in said meta-data display step;
- an execution step of conducting a search of the data registered in the database based on the search condition set in said setting step; and
- a matching step of prohibiting execution of said list display step from displaying information corresponding to data which does not actually exist in the database, and deletes the registration of the data, wherein said search step also includes conducting a search of data which is stored in a predetermined logical area and which is not registered in the database, and said matching step additionally registers the data in the database, and wherein said list display step includes displaying a list of a search result obtained by the search made in said execution step.

* * * * *